(12) United States Patent
Chen et al.

(10) Patent No.: US 8,589,973 B2
(45) Date of Patent: Nov. 19, 2013

(54) PEER TO PEER MEDIA DISTRIBUTION SYSTEM AND METHOD

(75) Inventors: Yih-Farn Chen, Bridgewater, NJ (US); David Crawford Gibbon, Lincroft, NJ (US); Zhu Liu, Marlboro, NJ (US); Behzad Shahraray, Freehold, NJ (US); Bin Wei, Basking Ridge, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1018 days.

(21) Appl. No.: 11/521,572

(22) Filed: Sep. 14, 2006

(65) Prior Publication Data

US 2008/0086754 A1    Apr. 10, 2008

(51) Int. Cl.
*H04N 7/10* (2006.01)
*H04N 7/025* (2006.01)

(52) U.S. Cl.
USPC .............. 725/34; 725/25; 725/32; 725/46; 725/86; 725/87; 725/97; 705/26.1; 707/622

(58) Field of Classification Search
USPC .................................................. 725/105
See application file for complete search history.

(56) References Cited

U.S. PATENT DOCUMENTS

| | | | |
|---|---|---|---|
| 5,634,012 A * | 5/1997 | Stefik et al. ................... 705/39 |
| 5,874,986 A | 2/1999 | Gibbon et al. | |
| 6,061,056 A * | 5/2000 | Menard et al. ................ 715/704 |
| 6,098,082 A | 8/2000 | Gibbon et al. | |
| 6,714,909 B1 | 3/2004 | Gibbon et al. | |
| 7,184,986 B2 * | 2/2007 | Ishibashi et al. ................ 705/52 |
| 2002/0010679 A1 * | 1/2002 | Felsher ............................. 705/51 |
| 2002/0083473 A1 * | 6/2002 | Agnihotri et al. ............ 725/140 |
| 2003/0120748 A1 | 6/2003 | Begeja et al. | |
| 2003/0163815 A1 | 8/2003 | Begeja et al. | |
| 2003/0208626 A1 | 11/2003 | Gibbon et al. | |
| 2003/0219226 A1 * | 11/2003 | Newell et al. ................... 386/69 |
| 2004/0025180 A1 | 2/2004 | Begeja et al. | |
| 2004/0032486 A1 * | 2/2004 | Shusman ................... 348/14.09 |
| 2004/0078188 A1 | 4/2004 | Gibbon et al. | |
| 2004/0078820 A1 * | 4/2004 | Nickum .......................... 725/58 |
| 2004/0122741 A1 * | 6/2004 | Sidman ........................... 705/26 |
| 2004/0230529 A1 * | 11/2004 | Tieu et al. ....................... 705/51 |
| 2005/0028194 A1 * | 2/2005 | Elenbaas et al. ................ 725/32 |
| 2005/0033747 A1 * | 2/2005 | Wittkotter ....................... 707/10 |
| 2006/0117040 A1 | 6/2006 | Begeja et al. | |
| 2006/0190615 A1 | 8/2006 | Panwar et al. | |
| 2007/0250880 A1 * | 10/2007 | Hainline ......................... 725/97 |
| 2007/0255742 A1 * | 11/2007 | Perez et al. ................... 707/102 |
| 2008/0065771 A1 * | 3/2008 | Marvit et al. ................. 709/226 |

OTHER PUBLICATIONS

Micali, Silvio and Rivest, Ronald L., Micropayments Revisited, 16 pages, Laboratory for Computer Science, Massachusetts Institute of Technology, Cambridge, MA 02139.

(Continued)

*Primary Examiner* — Joshua Taylor
(74) *Attorney, Agent, or Firm* — Toler Law Group, PC

(57) ABSTRACT

A method is disclosed that includes receiving a multimedia data stream comprising audio data, video data, and text data at a first electronic device of a plurality of electronic devices responsive to a network. A content structure of the multimedia data stream is automatically determined at least partially based on the text data. The portion of multimedia data stream is stored in a local media database and the associated content structure is stored in a local content index. A network index alert is generated to update a centralized content index of available media content via the network.

28 Claims, 13 Drawing Sheets

(56) References Cited

OTHER PUBLICATIONS

Jakobsson, Markus, et al., A Micro-Payment Scheme Encouraging Collaboratio in Multi-Hop Cellular Networks, 19 pages, RSA Laboratories, Bedford, MA 01730, USA.

Rivest, Ronald L., "Peppercoin Micropayments," Proceedings Financial Cryptography, Springer, 2004.

Wierzbicki, Adam et al, "Peer-to-Peer Direct Sales," Polish-Japanese Institute of Information Technology, 2005.

Wei, Kai et al, "WhoPay: A Scalable and Anonymous Payment System for Peer-to-Peer Environments," Computer Science Division (EECS), University of California, May 2005.

PCT/US2007/016434, International Search Report and Written Opinion mailed Feb. 14, 2008 (16 pages).

PCT/US2007/016434, International Preliminary Report and Written Opinion issued Mar. 17, 2009 (10 pages).

Plagemann, Thomas et al., "From content distribution networks to content networks—issues and challenges," Computer Communications, 2006, pp. 551-562, vol. 29.

Gibbon, David C. et al., "The Miracle Video Search Engine," AT&T Labs—Research, 2006, pp. 277-281.

* cited by examiner

US 8,589,973 B2

PEER TO PEER MEDIA DISTRIBUTION SYSTEM AND METHOD

FIELD OF THE DISCLOSURE

The present disclosure is generally related to video content distribution, and more particularly to systems and methods of distributing video media content via peer-to-peer communications.

BACKGROUND

Over the past decade, the number of available media sources has increased. For example, media consumers who are interested in news can receive information from news channels, Internet web logs (blogs), news aggregation web sites, podcasting, and the like. While broadcast television news channels typically provide edited video content, consumers often lack the time or the patience to watch an entire news program to see particular segments that are of interest.

Some organizations offer subscription news services for transmitting breaking news to a subscriber's electronic device (such as a mobile telephone, a pager, a personal digital assistant, and the like) based on the subscriber's preferences. However, such services typically utilize a centralized server architecture to deliver the content. With the volume of media content available, providing the variety of media content desired by different consumers can be complicated and expensive. Such systems can also be difficult to scale to accommodate more consumers and more content. Moreover, consumers can desire to view media content on various types of electronic devices, which can have different display capabilities, different types of network connections, and so on. Consequently, a centralized system can have difficulty providing a consistent quality of service to each of its consumers. Hence, there is a need for an improved system and method of media distribution.

DETAILED DESCRIPTION OF THE DRAWINGS

In a particular illustrative embodiment, a method is disclosed that includes receiving a multimedia data stream comprising audio data, video data, and text data at a first electronic device of a plurality of electronic devices responsive to a network. The method includes automatically determining a content structure of the multimedia data stream at least partially based on the text data, storing at least a portion of multimedia data stream in a local media database and storing associated content structure in a local content index. The method further includes generating a network index alert to update a centralized content index of available media content via the network.

In another particular illustrative embodiment, an electronic device is disclosed that includes a network interface responsive to a network, an acquisition module, a processing module, and a personal media alert module. The acquisition module is coupled to the network interface to capture a selected multimedia data stream. The processing module is coupled to the acquisition module to automatically extract a representative image and an associated text description from the selected multimedia data stream, where the processing module stores each data stream in a local content database and stores the image and the associated text description in a local content index. The personal media alert module searches the local content index and a centralized content index for keywords associated with a consumer profile and to assemble a list of data streams that include at least one of the keywords, where the personal media alert module generates an alert including the list of data streams to a display device coupled to the electronic device.

Figure 1:
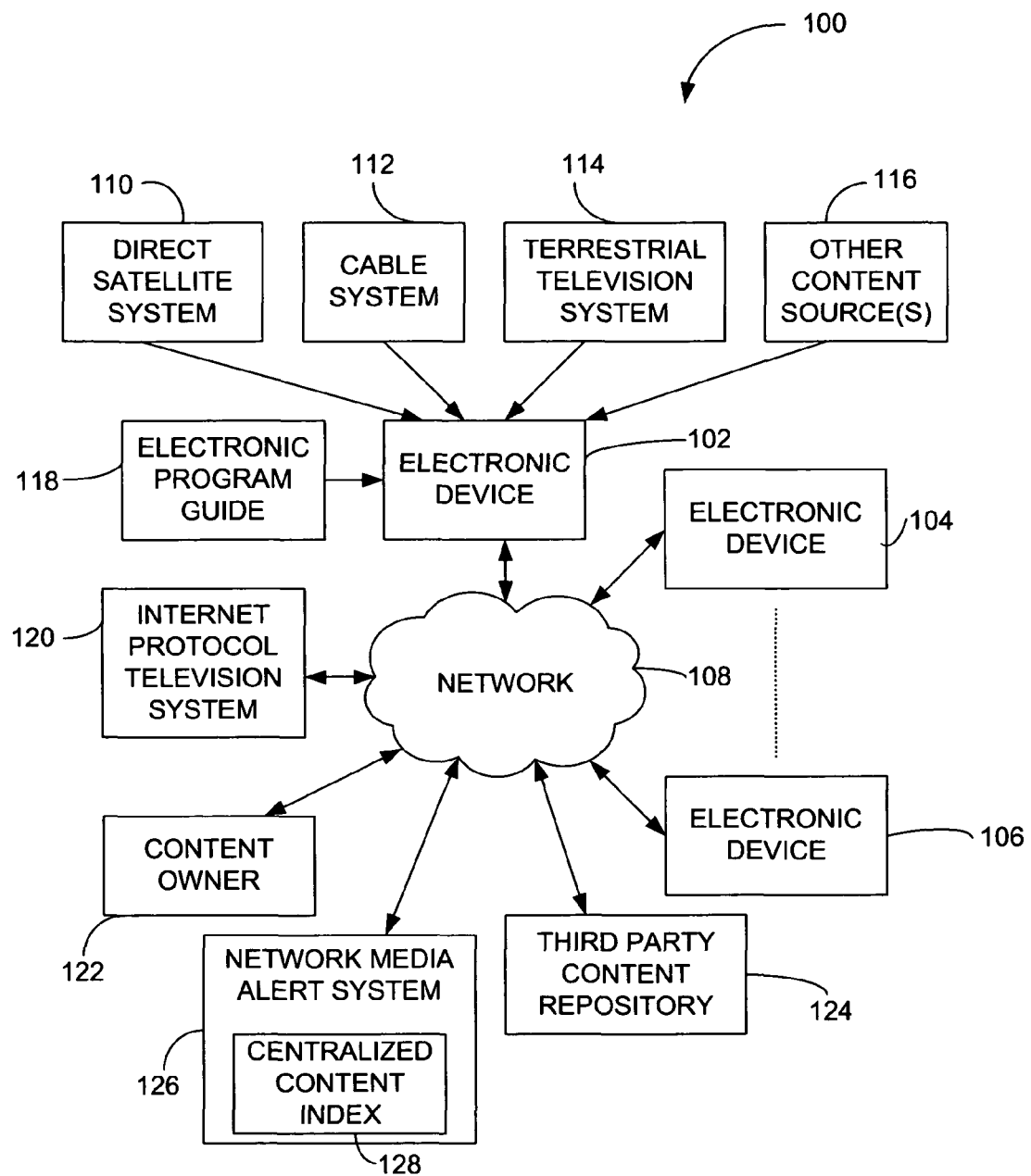
FIG. 1 is a block diagram of a particular illustrative embodiment of a system to disseminate media content.

FIG. 1 is a block diagram of a particular illustrative embodiment of a system 100 for peer-to-peer dissemination of multimedia content. In general, the term multimedia content or multimedia data stream is intended to refer to a stream, signal, or file that includes audio data, video data, text data, or any combination thereof. The system 100 includes a plurality of electronic devices, including electronic devices 102, 104, and 106, which can be communicatively coupled via a network 108. The electronic devices 102, 104 and 106 can be adapted to capture and disseminate multimedia data streams via the network 108. For example, the electronic devices 102, 104 and 106 can include computers, digital video recorders with peer-to-peer functionality, set-top boxes, game consoles, or any other type of device adapted to receive and store multimedia content and to share the multimedia content with other electronic devices via the network 108.

In a particular embodiment, the system 100 can include a direct satellite system 110, a cable system 112, a terrestrial (broadcast) television system 114, other content sources 116, an electronic program guide 118, an internet protocol television (IPTV) system 120, a content owner 122, a third party content repository 124, and a network media alert (NMA) system 126. In general, the electronic program guide 118 may include information about particular programs, including a channel, a time, a title, a brief description, a program rating, one or more actor names, and the like. The content sources 116 can include web sites, content providers, content sharing/file swapping web sites, and the like.

In a particular embodiment, the electronic device 102 can include a first interface to receive a broadcast multimedia data stream from the direct satellite system 110, from the cable system 112, from the terrestrial television system 114, from another content source 116, or from any combination thereof. Additionally, the electronic device 102 can receive a multimedia data stream via the network 108, which can be a local area network, a wide area network (such as the Internet), a wireless network, or any combination thereof. A multimedia data stream can be received, for example, in a National Television System Committee (NTSC) standard format, in an Internet Protocol (IP) format, or a compressed multimedia format, such as a moving pictures expert group (MPEG) format.

In an illustrative embodiment, the electronic device 102 is adapted to selectively capture multimedia data streams from the direct satellite system 110, the cable system 112, the terrestrial television system 114, another content source 116, the IPTV system 120, the content owner 122, the third party content repository 124, or any combination thereof. The electronic device 102 can select which multimedia data streams to capture based on a current channel selection, based on user preferences, based on other criteria, or any combination thereof. For example, a consumer may configure a local consumer profile of the electronic device 102 to include one or more keywords related to a subject matter of interest to the consumer. The electronic device 102 can capture portions of a multimedia data stream that are related to the key words.

Further, the electronic device 102 can process the multimedia content to produce a plurality of discrete data streams and store the plurality of discrete data streams in a local storage medium. The electronic device 102 can utilize information within and/or derived from each discrete data stream to create a text-based description of each discrete data stream. The electronic device 102 can categorize each discrete data stream based on the text-based description and generate a personal media alert to the consumer to deliver the relevant segments of the multimedia data streams.

Moreover, the electronic device 102 can select one or more discrete data streams of the plurality of discrete data streams and automatically make each selected discrete data stream available to other electronic devices, such as the electronic devices 104 and 106, via the network 108. For example, the electronic device 102 can generate a network index alert, including an image derived from the multimedia data stream and an associated text-based description, and transmit the network index alert to the NMA system 126, which can host a centralized content index 128 of available content.

Periodically, or upon detection of a change in the local content, the electronic device 102 can query its local storage media and the central index to create a user alert for the consumer that includes a listing of available multimedia content related to the consumer's local profile information, such as keywords. The consumer may select a particular multimedia data stream from the listing, and the electronic device 102 can access a local storage medium or generate an electronic payment to the NMA system 126 (or to a particular electronic device associated with the selected multimedia data stream, such as the electronic device 104) and access a storage medium of the electronic device 104 to retrieve the requested multimedia data stream for display. In general, each electronic device 102, 104 and 106 can periodically search (poll) the centralized content index 128 for keywords based on a respective consumer profile. When a keyword matches a word within the centralized content index 128, the electronic device can generate an alert including the image and associated text description in a user selectable list of available content to the associated consumer.

In a particular embodiment, when the multimedia acquisition and processing occur at electronic devices, rather than at a centralized network, the system 100 can provide multimedia content without requiring a license from each content provider. The multimedia content can be stored locally at each electronic device 102, 104, and 106 with a user's subscription. Moreover, the multimedia content can be shared with other users by peer-to-peer networking, using a peer-to-peer payment scheme that allows consumers select multimedia content stored in local storage media of another user's electronic device by allowing payments to be made to the original content provider and to the consumer that stores the media content locally.

Figure 2:
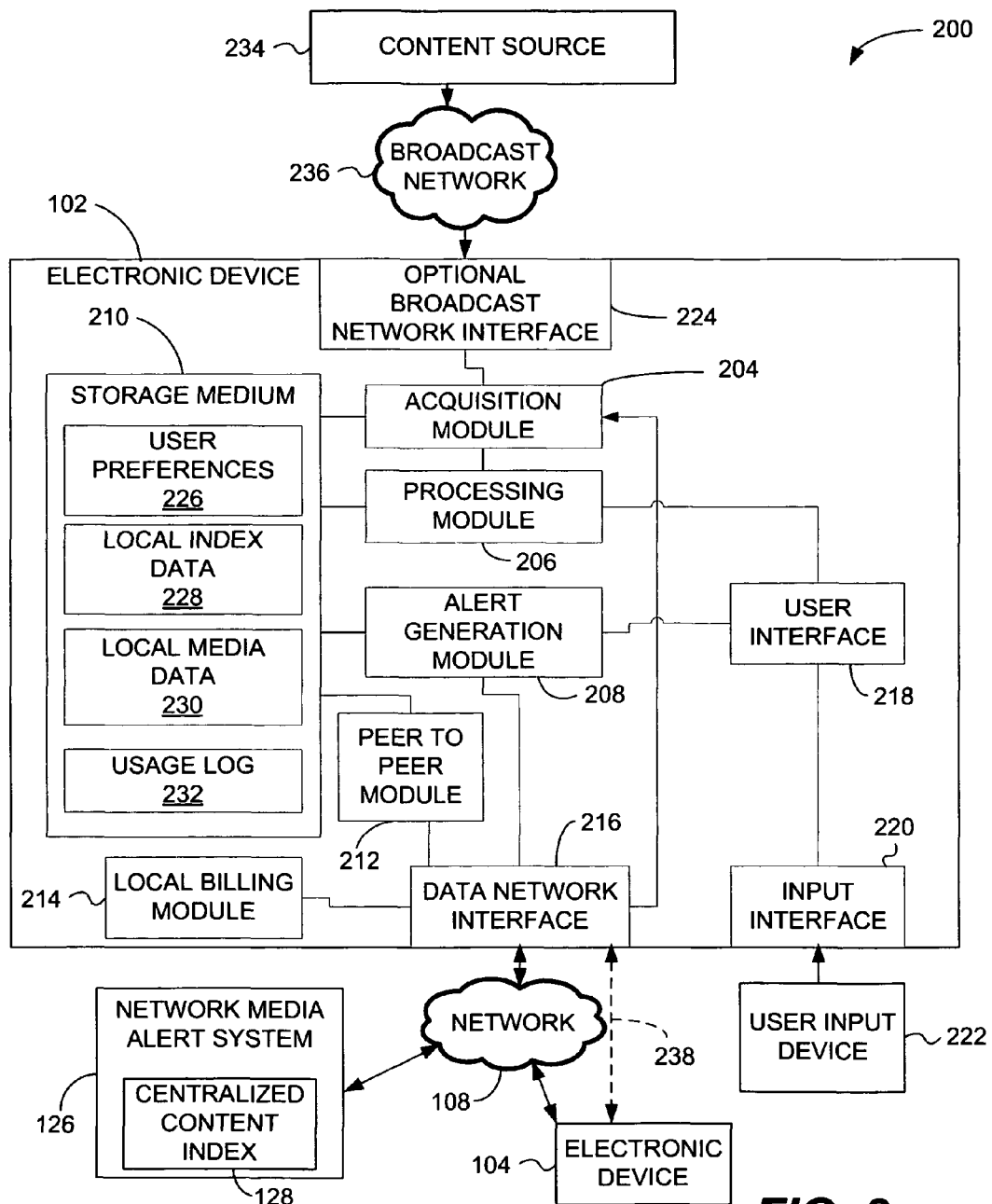
FIG. 2 is a block diagram of a second particular illustrative embodiment of a system to distribute media content, including elements of an electronic device such as that shown in FIG. 1.

FIG. 2 is a block diagram of a particular illustrative embodiment of a system 200 for peer-to-peer dissemination of multimedia content, including an electronic device, such as the electronic device 102 of FIG. 1. The system 200 can include the electronic device 102, which can communicate with the electronic device 104, for example, and the network media alert (NWA) system 126, having the centralized content index 128, via the network 108. The electronic device 102 can include an acquisition module 204, a processing module 206, an alert generation module 208, a storage medium 210, a peer-to-peer module 212, a local billing module 214, a data network interface 216, a user interface 218, and an input interface 220. The input interface 220 can be communicatively coupled to a user input device 222, such as a remote control, a keyboard, and the like. In a particular embodiment, the storage medium 210 can include user preferences 226, local index data 228, local media data 230, and a usage log 232.

In general, the electronic device 102 can receive multimedia data streams via the network interface 216. However, in a particular embodiment, the electronic device 102 can include an optional broadcast network interface 224 to receive multimedia data streams from a content source 234 via a broadcast network 236, such as a cable network, a satellite network, public airwaves, and the like. In another particular embodiment, the broadcast network interface 224 can receive multimedia data streams from a video cassette recorder (VCR), a digital video disc (DVD) player, an MP3 player, a personal digital assistant (PDA), or other electronic device.

In operation, the received multimedia data stream is provided to the acquisition module 204, which can selectively record portions of the multimedia data stream. The acquisition module 204 can acquire portions of multimedia data streams according to keywords within the metadata of the multimedia data stream.

The processing module 206 is adapted to process each recorded portion to extract metadata within the recorded portion and to extract closed-caption information within the recorded portion. The metadata can include some information about the multimedia data stream, such as a program identifier, a broadcast time, and a brief description of the content from an electronic program guide for example. The processing module 206 can optionally use speech recognition tools to derive additional information about the content of the recorded portions and can use timing information derived from the speech recognition to align the closed-captioning content with the audio and video features of the multimedia data stream. The processing module 206 can generate a text description of the recorded portion based on the metadata and the closed-caption information. In a particular embodiment, the processing module 206 can combine the metadata and the text description to create a page/paragraph structure of the media, such as a multimedia representation including a representative image and the associated text description. Each paragraph can be composed of a video frame and a set of related closed-captioning and/or speech recognition text to present the recorded portion of the multimedia data stream in a manner that is easy for consumers to browse the content non-linearly, such as by scanning for a particular scene, person, background, or any combination thereof.

The alert generation module 208 can access user preferences 226 on the storage medium 210 to identify keywords in a profile of the consumer. The alert generation module 208 can automatically generate an alert if keywords for a topic of interest match content in the recorded portions. For example, keywords for topics can be correlated against closed-caption text, transcribed text from speech recognition modules, and other metadata, including the electronic program guide information. The alert generation module 208 can provide a personal media alert to the user interface 218, which can include a display (not shown), such as a television set, a computer monitor, a liquid crystal display screen, or any combination thereof.

Additionally, the alert generation module 208 can generate an index update alert and transmit the index update alert to the network media alert system 126 via the network interface 216 and the network 108. The index update alert can include the page/paragraph structure created by the processing module 206 for recorded portions that the consumer is willing to share. For example, the consumer may configure the electronic device 102 to share content according to specific categories, such as news, weather, and the like. In a particular embodiment, the user can elect to share content related only to particular subjects, such as news stories, but not other types of recorded content. For example, the user can elect to share only content that is related to the keywords "Life on Mars."

Each of the electronic devices 102, 104 and 106 (in FIG. 1) can include an acquisition module, a processing module, and an alert generation module. Additionally, it should be understood that while these features are shown as distinct components, each of these components can be implemented in software within an integrated software application.

Other electronic devices, such as electronic device 104, can be notified of the available recorded content via the centralized content index 128. An alert generation module of the electronic device 104 can generate an alert to an associated consumer related to the available content, when the content of the centralized content index 128 matches a keyword of the consumer at the electronic device 104. The consumer at the electronic device 104 can select the content via the alert and establish a peer-to-peer connection (indicated by dotted line 238) to access the available content from the electronic device 102. In a particular embodiment, the request for the available content can be brokered by the network media alert system 126, which can aggregate payments to reduce overhead due to individual transaction fees. For example, a micropayment can be a payment amount that is less than a transactional cost associated with charging an electronic payment. If a multimedia stream cost is approximately $0.01 and the transactional cost is $0.25, the multimedia stream cost is a micropayment, and payment of that amount would cost approximately $0.26. However, by aggregating payments, a single electronic transaction can include multiple micropayments with a single transaction fee.

In an alternative embodiment, each electronic device can record requests to access the recorded portions. For example, the electronic device 102 can record access requests in the usage log 232 of the storage medium 210, including a date, a time, a payment amount, an electronic payment, a electronic device identifier, other information, or any combination thereof. The local billing module 214 can aggregate payments and transmit a single transaction billing request, including recorded access requests from the usage log 232, to the network media alert system 126 when a predetermined number of peer-to-peer transactions have been completed.

Figure 3:
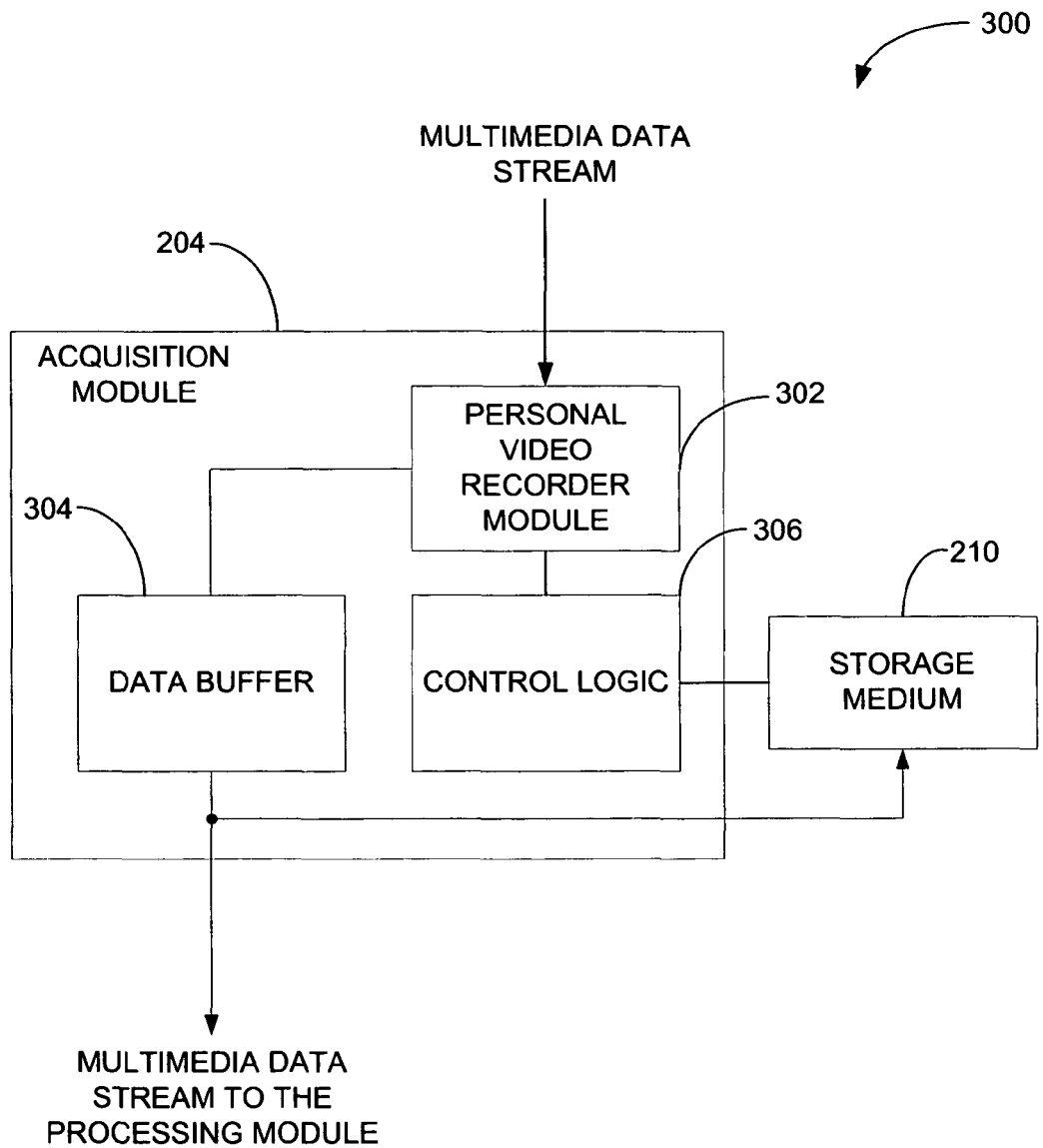
FIG. 3 is a block diagram of a third particular illustrative embodiment of a system to distribute media content, including elements of an acquisition module illustrated in FIG. 2.

FIG. 3 is a block diagram of a third particular illustrative embodiment of a system to distribute media content, including elements of an acquisition module 204 of the electronic device 102 shown in FIG. 2. The acquisition module 204 includes a personal video recorder (PVR) module 302, a data buffer 304, and control logic 306. The PVR module 302 is adapted to capture at least a portion of a multimedia data stream. The control logic 306 is adapted to access consumer profile information (including user preferences) stored within the storage medium 210 to retrieve keywords and consumer profile information, including digital video recorder (DVR) schedule information. The control logic 306 can control the PVR module 302 to record the portions of the multimedia data stream that relate to the schedule information configured by the consumer, that relate to keywords provided in the consumer's profile, or any combination thereof. The PVR module 302 can search the metadata of the multimedia data stream to detect keywords. When a keyword is found, the PVR module 302 can record at least a portion the multimedia data stream to a data buffer 304 before providing the recorded portion of the multimedia data stream to the processing module 206 or to the storage medium 210.

In a particular embodiment, the acquisition module can be built on the Microsoft XP® Media Center Edition (MCE) platform. An electronic device with the MCE platform is generally a personal video recorder (PVR) system with the capability of scheduling a single recording or a series of recordings of multimedia content, such as television broadcasts, with integrated electronic program guide support. An MCE device can record a television show in a digital video recorder Microsoft (DVR-MS) file format. The MCE device can capture the electronic program guide, the closed captioning text, the audio data, and the video data can be captured in a single file.

Figure 4:
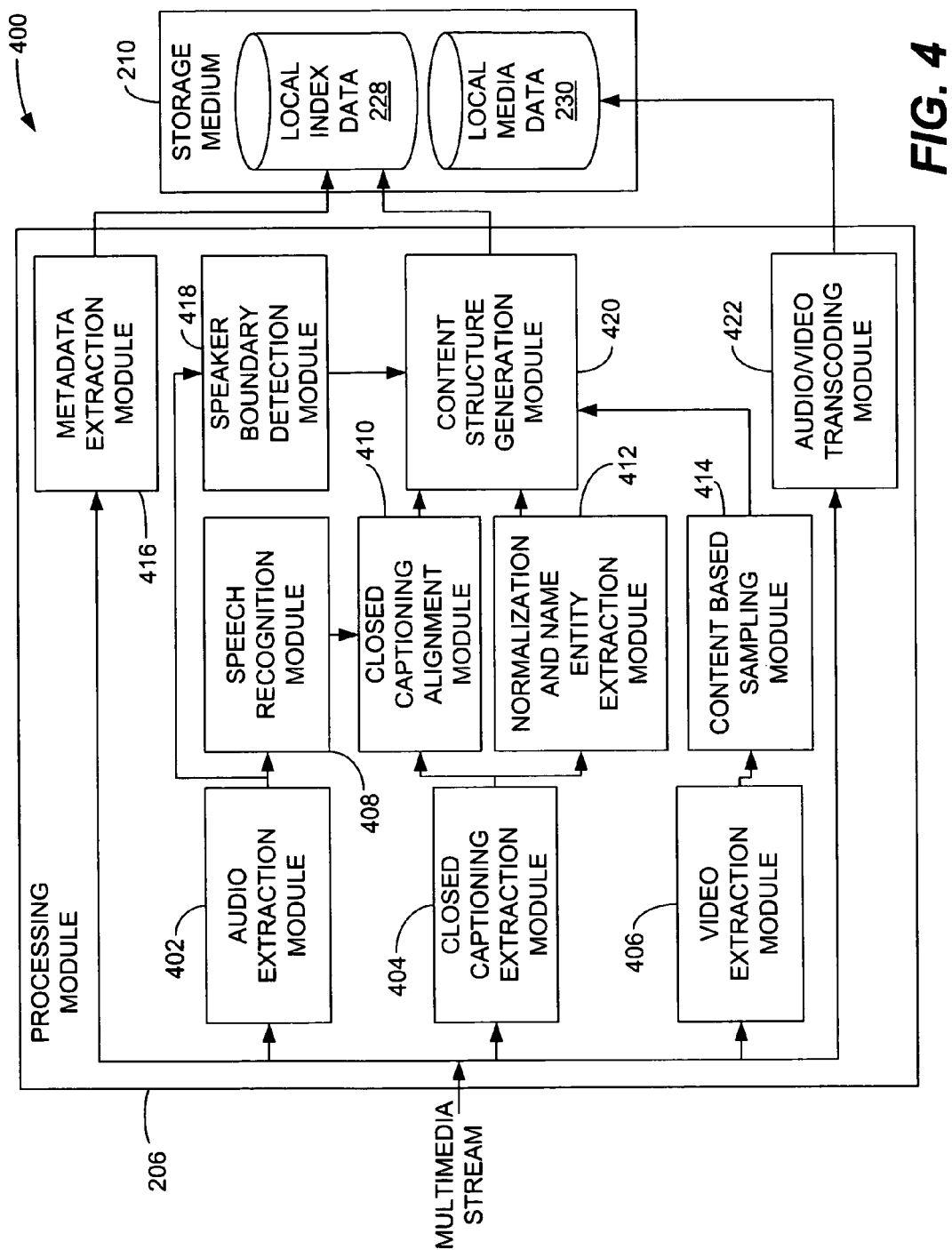
FIG. 4 is a block diagram of a fourth particular illustrative embodiment of a system to distribute media content, including elements of a processing module illustrated in FIG. 2.

FIG. 4 is a block diagram of a fourth particular illustrative embodiment of a system to distribute media content, including elements of a processing module 206 of the electronic device 102 shown in FIG. 2. The processing module 206 includes an audio extraction module 402, a closed-captioning extraction module 404, a video extraction module 406, a speech recognition module 408, a closed-captioning alignment module 410, a normalization and name entity extraction module 412, a content based sampling module 414, a metadata extraction module 416, a speaker boundary detection module 418, a content structure generation module 420, and an audio/video transcoding module 422. The processing module 206 can be coupled to the storage medium 210, which can include local index data 228 and local media data 230.

In operation, the processing module 206 receives the multimedia stream. The multimedia stream is provided to the audio extraction module 402, to the closed-captioning extraction module 404, to the video extraction module 406, and to the metadata extraction module 416. Optionally, the multimedia stream can be provided to the audio/video transcoding module 422. The audio extraction module 402 extracts audio data from the multimedia stream. The extracted audio data can be provided to a speech recognition module 408 to convert audio data to text data that is aligned with the video of the multimedia data stream. The extracted audio data can also be provided to the speaker boundary detection module 418 to generate boundary information based on audio information of the multimedia stream.

The closed-captioning extraction module 404 extracts closed-caption text data from the multimedia data stream and provides the extracted closed-caption text data to the closed-captioning alignment module 410 and to the normalization and name entity extraction module 412. In general, the closed-captioning information can include rich content information about the program. The extracted closed-captioning information can be utilized to perform a text search to identify particular video clips. In a particular embodiment, when the closed-captioning information is delayed with respect to the audio data, which can noticeably impact the quality of video browsing and query functionality, the speech recognition module 408 can generate a transcript for the extracted audio data. The closed-captioning alignment module 410 utilizes the accurate timing information from the transcript to align the more accurate closed-captioning transcription with the audio data. Alternatively, a parallel text alignment algorithm can be utilized to import and to align high quality off-line transcripts of the program. The normalization and name entity extraction module 412 can utilize a rule-based capitalization algorithm trained from multiple sources, including Associated Press (AP) newswire data, online stories published by national media companies, other sources, or any combination thereof. To index and to present the content, named entities, including country names, person names, locations, titles, and the like can be extracted from the closed-captioning data.

The multimedia stream is also provided to the video extraction module 406, which extracts the video data and can provide the video data to the content based sampling module 414. The sampling module can capture individual frames from the video data and provide them to the content structure generation module 420. In general, the content based sampling module 414 is adapted to detect abrupt and gradual transitions in the multimedia data stream and retains a set of frames from the multimedia stream to generate a compact representation of the video program. The speaker boundary information from the speaker boundary detection module 418, the closed captioning information from the closed-captioning alignment module 410, data from the normalization and name entity extraction module 412 and the sampled frames from the content based sampling module 414 can be provided to the content structure generation module 420, which combines the information to create a page/paragraph structure of the multimedia stream. In a particular embodiment, each paragraph is composed of a frame and set of related closed-captioning text. This paragraph structure represents the multimedia stream in a manner that can be readily browsed. The page/paragraph structure can then be stored in the local index data 228 of the storage medium 210 together with extracted metadata from the metadata extraction module 416. Additionally, the content index can be copied to a centralized index server for sharing with other electronic devices.

While a high quality motion video can carry more information than sampled video streams, in some cases and on some devices, video replay is either not an option or can be too processor intensive. Accordingly, the processing module 206 can include the audio/video transcoding module 422 to convert or transcode the recorded portion of the multimedia data stream into one or more alternative formats (e.g. from broadcast video to other formats), such as standard definition (SD) windows media video (WMV) (e.g. 2 Mbps/640×480/ 29.97 frames per second), vertical helical scan (VHS) video (e.g. 600 Kbps/320×240/29.97 fps), and low bitrate (LB) video (150 Kbps/224×168/15 fps). The media content can be saved in the local storage medium 210, while the local index data 228 can be selectively copies to the centralized content index, such as the centralized content index 128 of FIG. 1.

Figure 5:
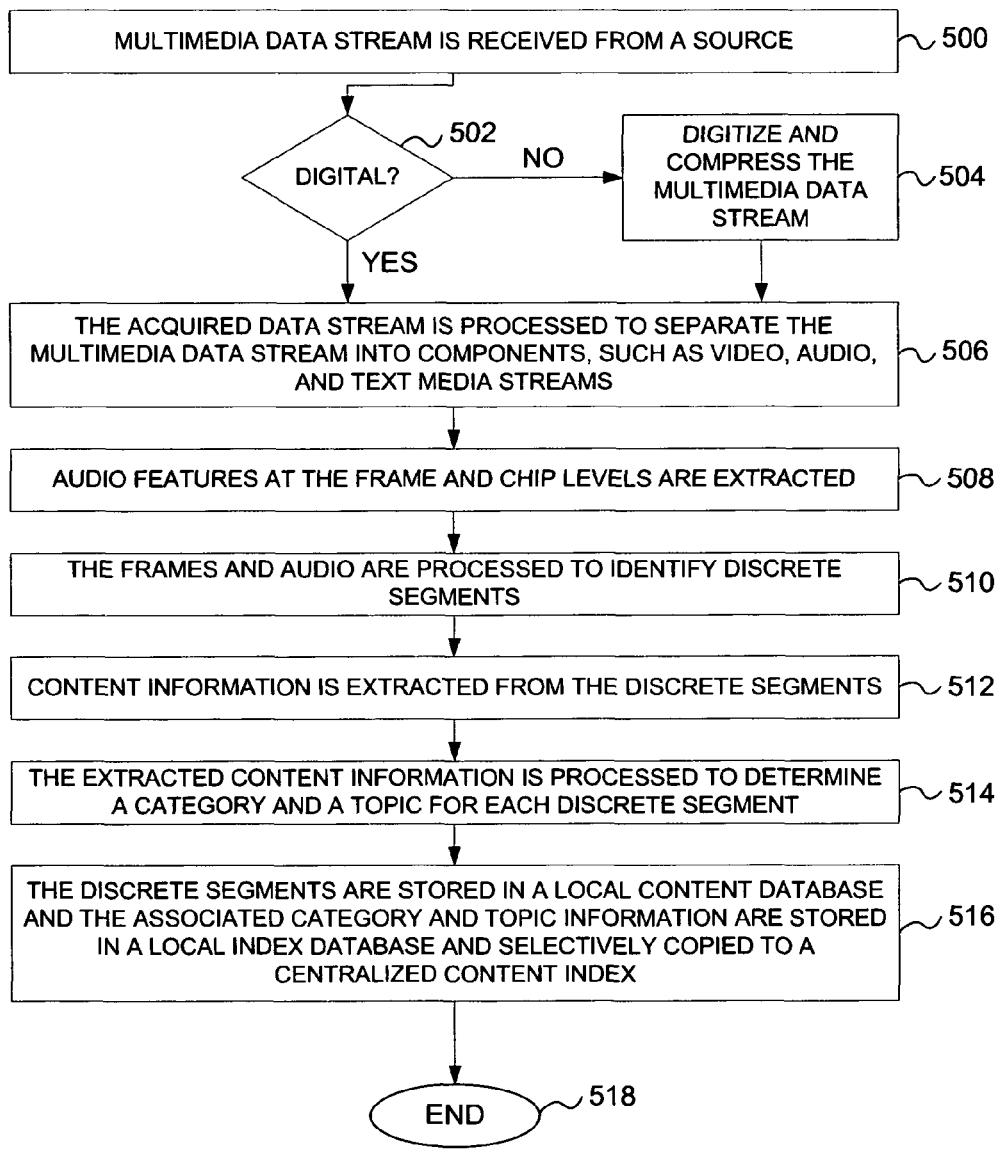
FIG. 5 is a flow diagram of a particular illustrative embodiment of a method of receiving media content.

FIG. 5 is a flow diagram of a particular illustrative embodiment of a method of receiving media content. A multimedia data stream is received at the electronic device from a source (block 500). The electronic device determines whether the multimedia data stream is digital (block 502). If the multimedia data stream is not digital, the multimedia data stream is digitized and compressed (block 504). If the multimedia data stream is in a digital format, or has been digitized and compressed, the acquired data stream is processed to separate the multimedia data stream into components, such as video, audio and text data streams (block 506). Audio features are extracted from the audio data stream (block 508). The video data stream and the audio data stream are processed to identify discrete segments (block 510). Content information is extracted from the discrete segments (block 512). The extracted content information is processed to determine a category and a topic for each discrete segment (block 514). The discrete segments are stored in a local content database, and the associated category and topic information are stored in a local index database and selectively copied to a centralized content index (block 516). The method terminates at 518.

Figure 6:
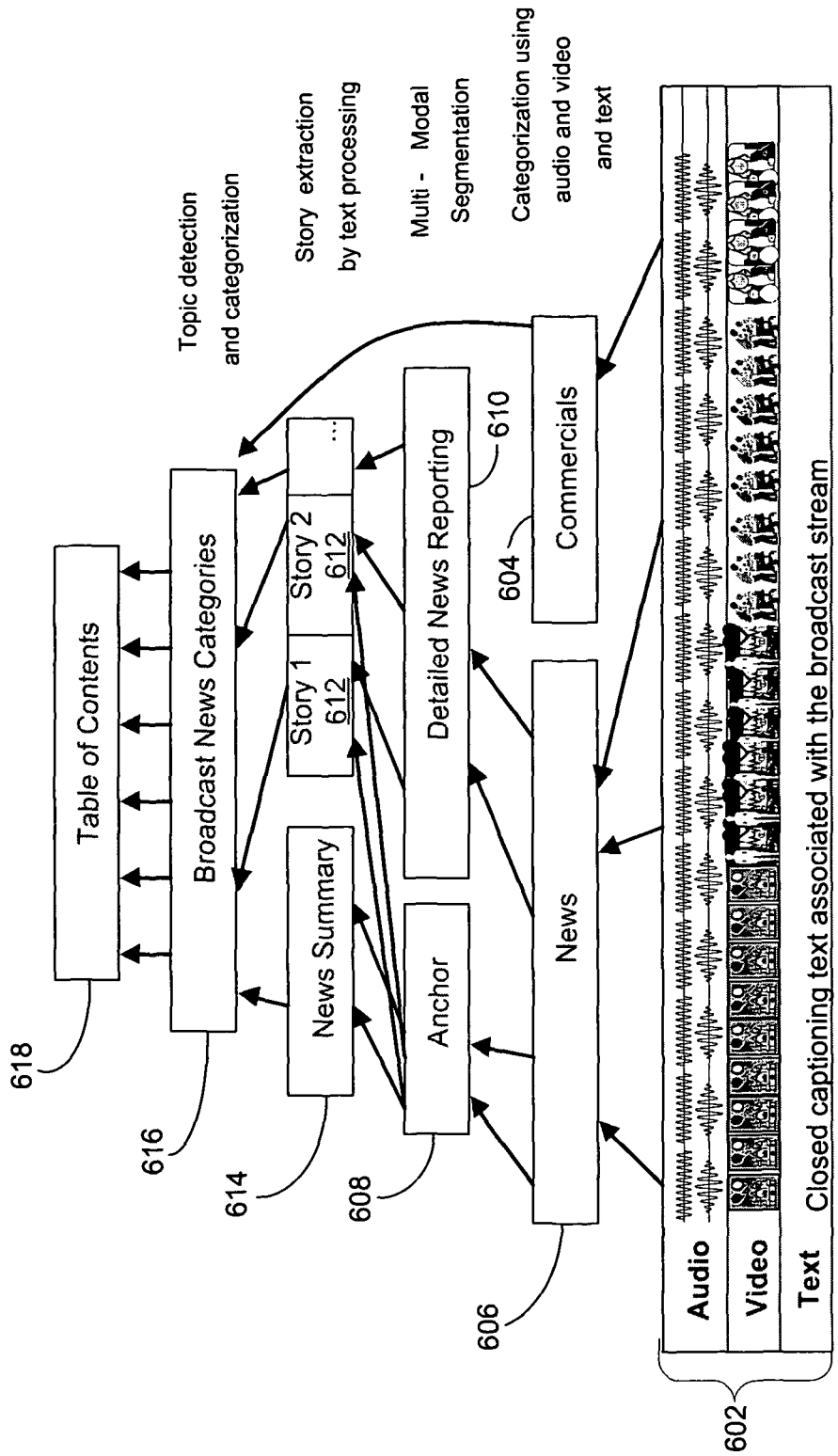
FIG. 6 is an illustrative diagram of a particular illustrative embodiment of a content hierarchy of a multimedia data stream.

FIG. 6 is an illustrative diagram of a particular illustrative embodiment of a content hierarchy of a multimedia data stream. The lowest level 602 contains the continuous multimedia data stream, which includes audio data, video data, and text data. The audio, video and text can be separated to facilitate linear information retrieval. Generally, the audio, video and text are synchronized in time. The text data can be derived from closed-captioning data provided by a content source or by the media provider. Alternatively, the text can be derived from an automatic speech recognition engine (such as the speech recognition module 408 in FIG. 4). If text originates from closed captioning, time alignment between the audio and text can be performed to better align the closed-captioning text to the video data.

At the next level, commercials can be separated from the media data stream at 604. The remaining portion of the media data stream is the news 606. The news can be segmented based on different speakers, including a news anchor 608 and others 610, for example. In this step, a detected anchor can be used to preliminarily identify a set of story boundaries to partition or segment the continuous text into distinct blocks of text. The segments of text can be grouped to define discrete news stories 612 and news introductions or summaries 614 at a higher level of semantic abstraction. Additionally, each news story can include the story by itself, the anchor person's introduction to the story, discussion between the anchor person and one or more other commentators, or any combination thereof. Using the extracted stories 612 and summaries/introductions 614, the subject matter or topic of the news can be determined in order to categorize the news segments into one or more broadcast news categories 616, which can be utilized to create a table of contents. The news summary 614 and the broadcast news categories 616 can be used to provide content-based browsing and nonlinear information retrieval of the multimedia content via the table of contents 618. The electronic device, such as the electronic device 102 of FIG. 2, can store the table of contents 618 in a local content index, such as the local content index 228 in FIG. 2. The electronic device 102 can generate an update to the centralized content index 128 (in FIGS. 1 and 2) to notify other electronic devices of the available content. Additionally, the electronic device 102 may generate a personal media alert to a display device that is coupled to the electronic device 102.

Figure 7:
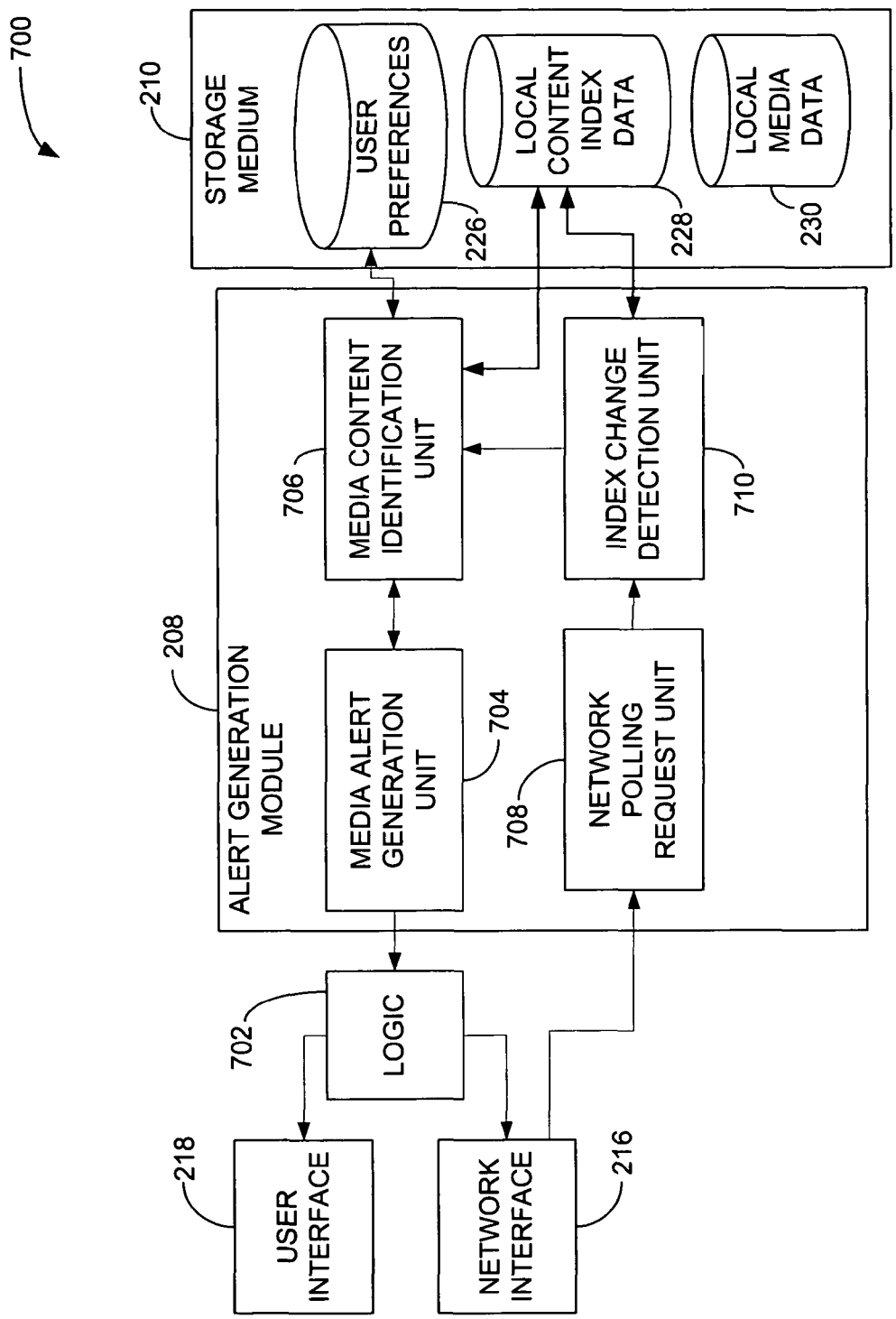
FIG. 7 is a block diagram of a fifth particular illustrative embodiment of a system to distribute media content, including elements of an alert generation module illustrated in FIG. 2.

FIG. 7 is a block diagram of a fifth particular illustrative embodiment of a system 700 to distribute media content, including elements of the alert generation module 208 illustrated in FIG. 2. The alert generation module 208 can be coupled to a storage medium 210 and to logic 702. The alert generation module 208 can include a media alert generation unit 704, a media content identification unit 706, a network polling request unit 708, and an index change detection unit 710. The storage medium 210 includes user preferences 226, local content index data 228, and local media data 230. In general, the index change detection module 710 monitors the local content index data 228 for changes. If a change is detected, the index change detection unit 710 notifies the media content identification unit 706, which accesses the user preferences 226 to retrieve keywords and other consumer profile data and which compares the retrieved keywords to the new information in the local content index data 228. If a keyword matches the local content index data, the media content identification unit 706 notifies the media alert generation unit 704, which generates an alert. The alert is provided to logic 702, which presents the alert to the user interface 218. Additionally, the logic 702 can direct the alert or copy the changes to the local content index data 228 to a centralized content index 128. The network polling request unit 708 is adapted to process requests from a network media alert system 126 for updated index information. The network polling request unit 708 can activate the index change detection unit 710 to initiate the media alert generation.

In a particular embodiment, the media content identification unit 706 can query both the local content index data 228 and a centralized content index 128 for new or updated matches to one or more keywords. The media alert generation unit 704 can generate a first alert to the user interface 218 to indicate available media content (both locally stored and remotely stored on other electronic devices, such as electronic device 104). The media alert generation unit 704 can also generate a second alert to the network media alert system 126 to update the centralized content index 128 with page/paragraph information derived from local media content and stored in the local content index data 228.

In general, a consumer may identify topics of interest and associated keywords in his or her profile, which can be stored in the user preferences 226. Each topic in the consumer's profile can include one or more keywords and can utilize a different subset of available program sources. An alert can be created by the alert generation module 206, and more specifically by the media alert generation unit 704, when the keywords for a topic in the interest profile of the consumer matches content in the program sources associated with the topic. The media content identification unit 706 can correlate keywords for topics against closed-captioning text, speech recognized audio segments, and other metadata, including but not limited to electronic program guide information. In a particular embodiment, the index change detection unit 710 can execute periodically, such as at specific pre-determined times during the day, to poll the local content index data 228, a centralized content index (such as centralized content index 128 in FIGS. 1 and 2), to poll other electronic devices (such as the electronic devices 104 and 106 in FIG. 1), or any combination thereof, and to generate a media alert that includes a user selectable listing of available multimedia content from the storage medium 210 or from other peer devices.

Figure 8:
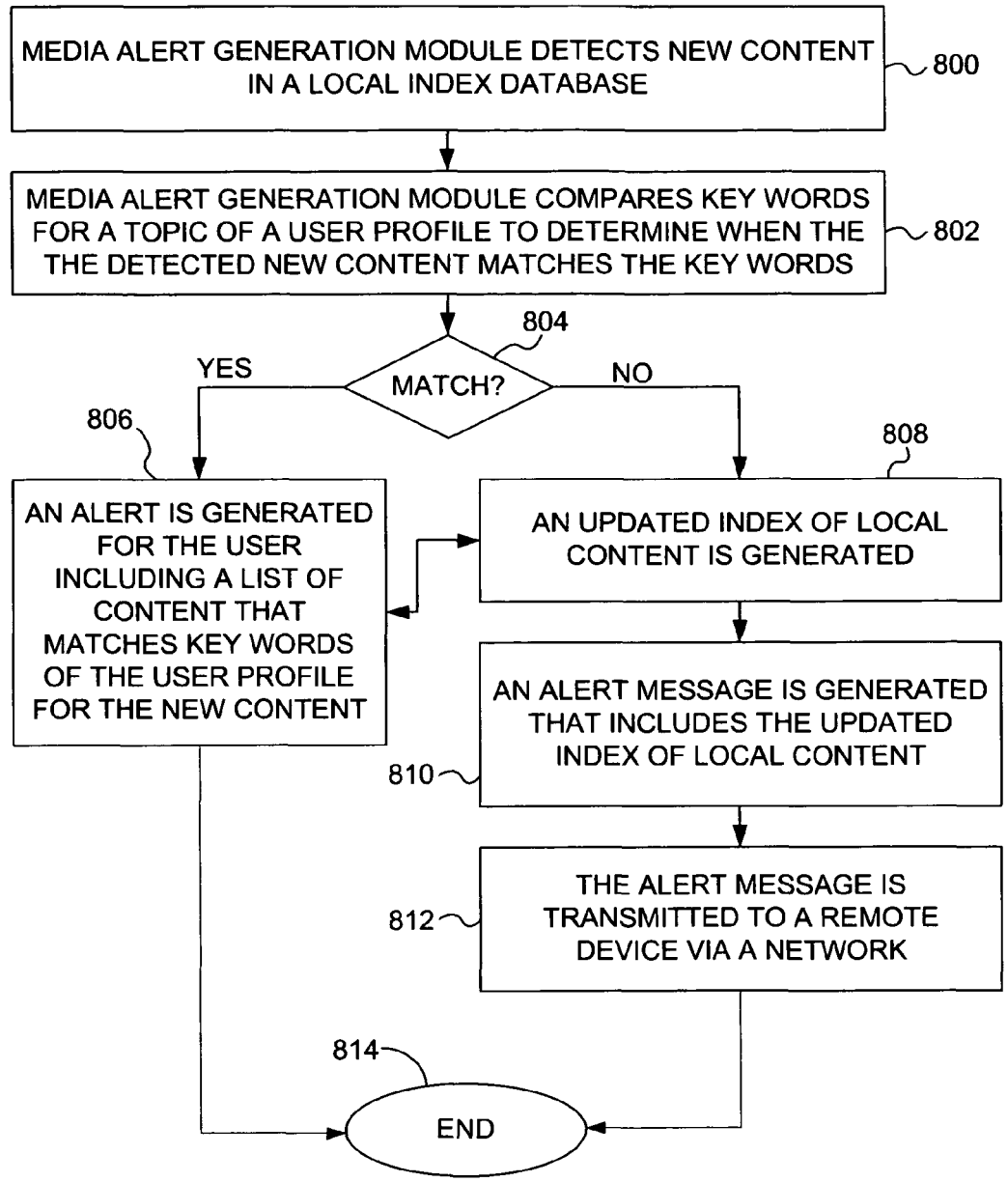
FIG. 8 is a flow diagram of a particular illustrative embodiment of a method of peer-to-peer media distribution.

FIG. 8 is a flow diagram of a particular illustrative embodiment of a method of peer-to-peer media distribution. The media alert generation module detects new content in a local index database (block 800). The media alert generation module compares keywords for a topic of a consumer profile to determine when the detected new content matches the keywords (block 802). The media alert generation module identifies when there is a match (block 804). If the media alert generation module identifies a match, an alert is generated for the user including a list of content that matches keywords of the user profile for the new content (block 806). If the media alert generation module fails to identify a match, the media alert generation module generates an updated index of local content (block 808). The media alert generation module generates an alert message that includes the updated index of local content (block 810). The media alert generation module transmits the alert message to a remote device via a network (block 812). In a particular embodiment, the alert message is transmitted to a personal media alert system, such as the network media alert system 126 in FIG. 1, to update the centralized content index 128. The method terminates at 814.

Figure 9:
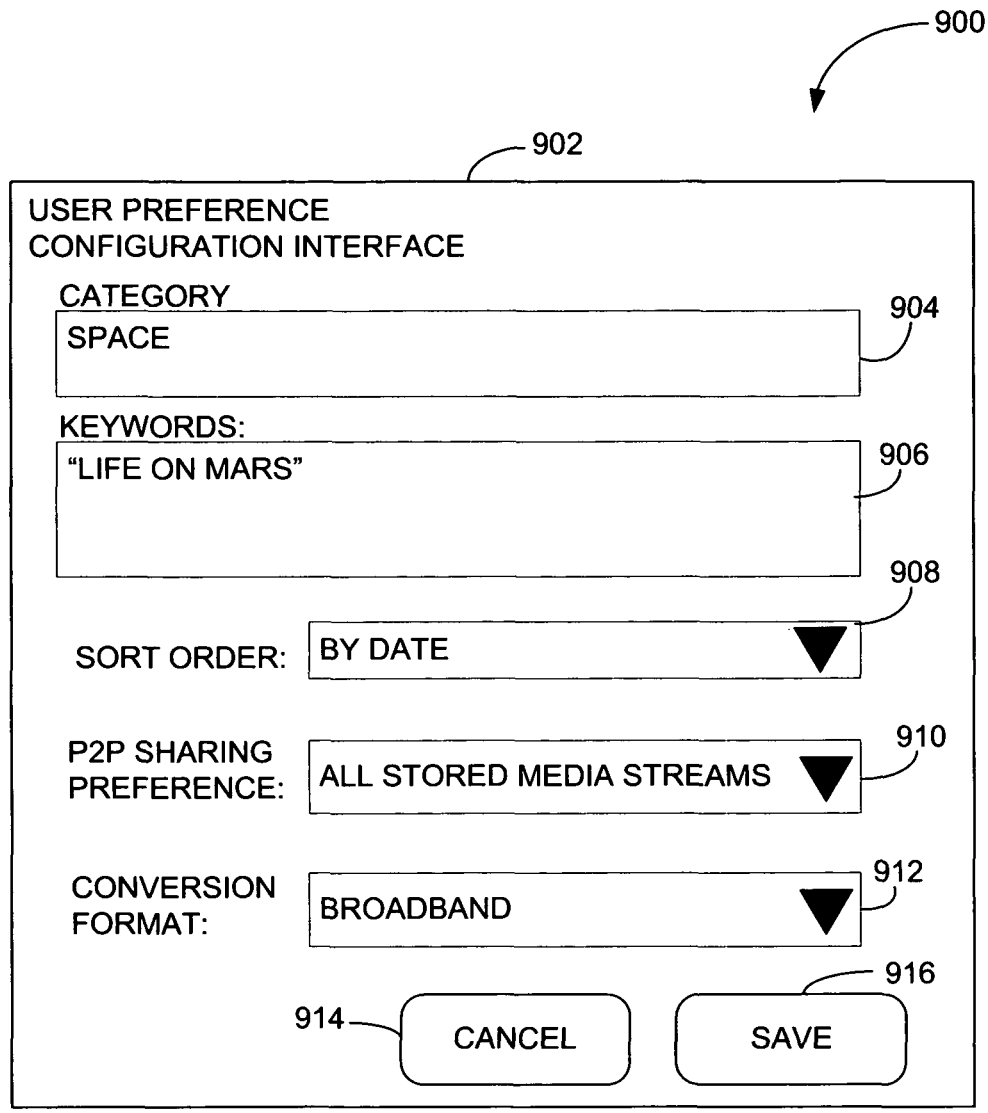
FIG. 9 is a diagram of a particular illustrative embodiment of a user interface to configure consumer preferences or user settings for receiving media content.

FIG. 9 is a diagram of a particular illustrative embodiment of a user interface 900 to configure consumer preferences or user settings for receiving media content. The user interface 900 includes a settings region 902, which can include text fields 904 and 906, pull down menus 908, 910, 912, and buttons 914 and 916, for example. In the illustrated example, the text field 904 includes a category term, such as "space." The text field 906 includes the phrase "Life on Mars" as keywords of interest to the consumer, within the category "space." The consumer has selected a sort by date order using the pull down menu 908. The consumer has chosen to share all stored media streams with other peers using the pull down menu 910. The consumer has chosen to convert recorded multimedia data streams to a broadband format using the pull down menu 912. The consumer may cancel the selections by selecting the cancel button 914 or save the selections by selecting the save button 916. Assuming that the consumer saves this selection, the consumer's electronic device (which can be a set-top box device or a computer, for example) will acquire multimedia content that includes identified subject matter related to "life on Mars" and will share the acquired multimedia content by posting the local content index to the centralized content index.

In general, a user can access the configuration interface 900 using a web browser, a remote control menu selection, or via other user input devices. Additionally, the options shown are illustrative only. Any number of user selection options, category selections, and text fields can be provided to allow a consumer to customize their information retrieval experience. For example, the pull down menu 910 can include a "custom" option, which causes the configuration interface 900 to provide a list of available media content to allow the user to select particular media content for sharing. Additionally, the pull down menu 912 can include a dial-up option or other options. Depending on which option is selected, a processing module, such as the processing module 206 in FIG. 2, may compress the multimedia data stream.

Figure 10:
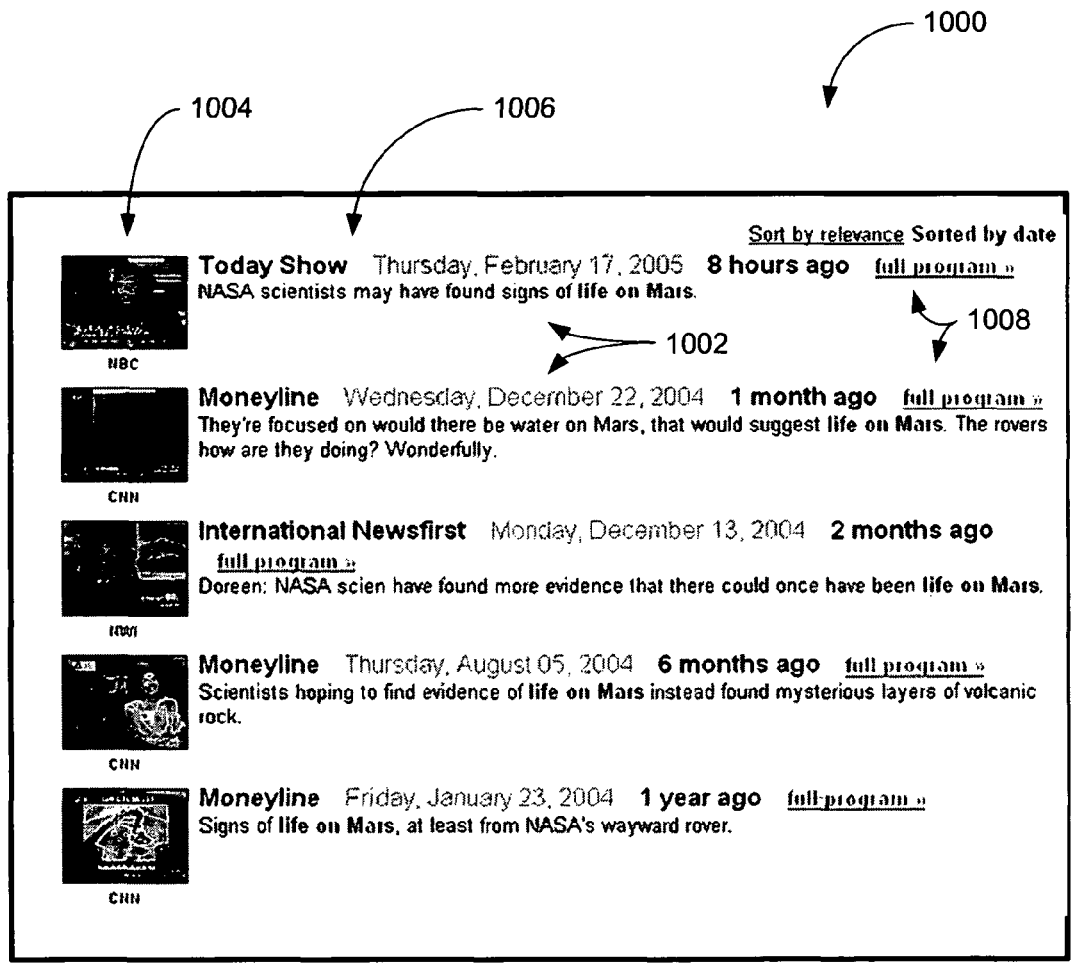
FIG. 10 is a diagram of a second particular illustrative embodiment of a user interface to receive media content.

FIG. 10 is a diagram of a second particular illustrative embodiment of a user interface 1000 to receive media content. As shown, the user interface includes selectable elements 1002, which display a frame 1004 taken from the recorded multimedia data stream and associated text 1006 derived from the closed-captioning and metadata information embedded in the multimedia data stream. In this instance, the first listing can be a clip taken from the Today Show on Thursday, Feb. 17, 2006, which includes text that "NASA scientists may have found life on Mars." The second listing includes a video clip taken from a Moneyline program on Wednesday Dec. 22, 2004, and so on. In this instance, each selection provides a clickable link 1002 includes a user selectable link 1008 to the full program, rather than the specific segment.

Figure 11:
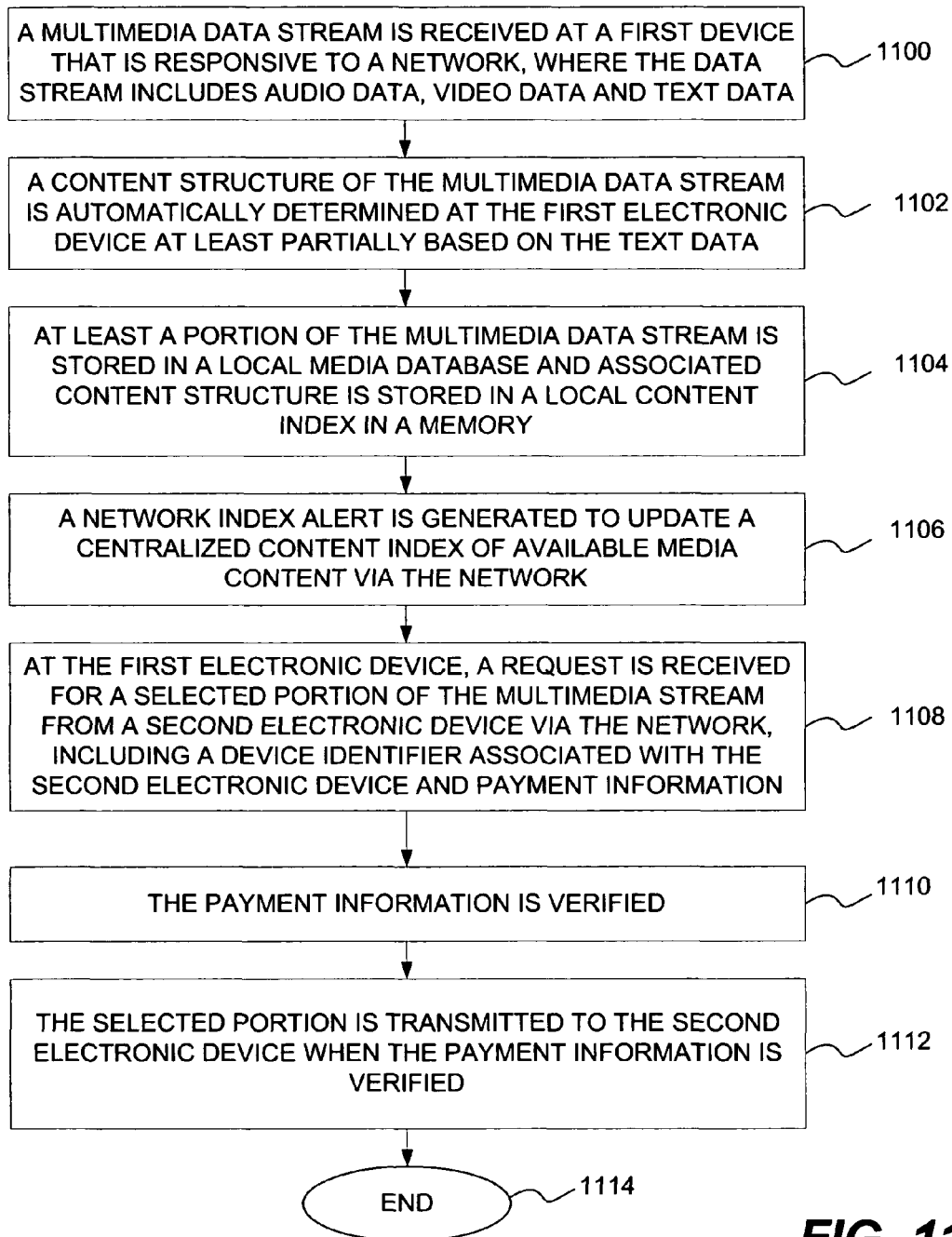
FIG. 11 is a flow diagram of a second particular illustrative embodiment of a method of distributing media content.

FIG. 11 is a flow diagram of a second particular illustrative embodiment of a method of distributing media content. A first electronic device of a plurality of electronic devices receives a multimedia data stream, where the plurality of electronic devices are responsive to a network and where the multimedia data stream includes audio data, video data, and text data (block 1100). The electronic device automatically determines a content structure of the multimedia data stream at least partially based on the text data (block 1102). The electronic device stores at least a portion of the multimedia data stream in a local media database and stores associated content structure in a local content index (block 1104). The electronic device generates a network index alert to update a centralized content index of available media content via the network (block 1106). In a particular embodiment, the network index alert can include an image related to the video data of the portion, the associated content structure, and a unique identifier.

The first electronic device receives a request for a selected portion of the multimedia data stream from a second electronic device via the network, where the request includes a device identifier associated with the second electronic device and payment information (block 1108). The electronic device verifies the payment information (block 1110). The electronic device transmits the selected portion to the second electronic device when the payment information is verified (block 1112). The method terminates at 1114.

Figure 12:
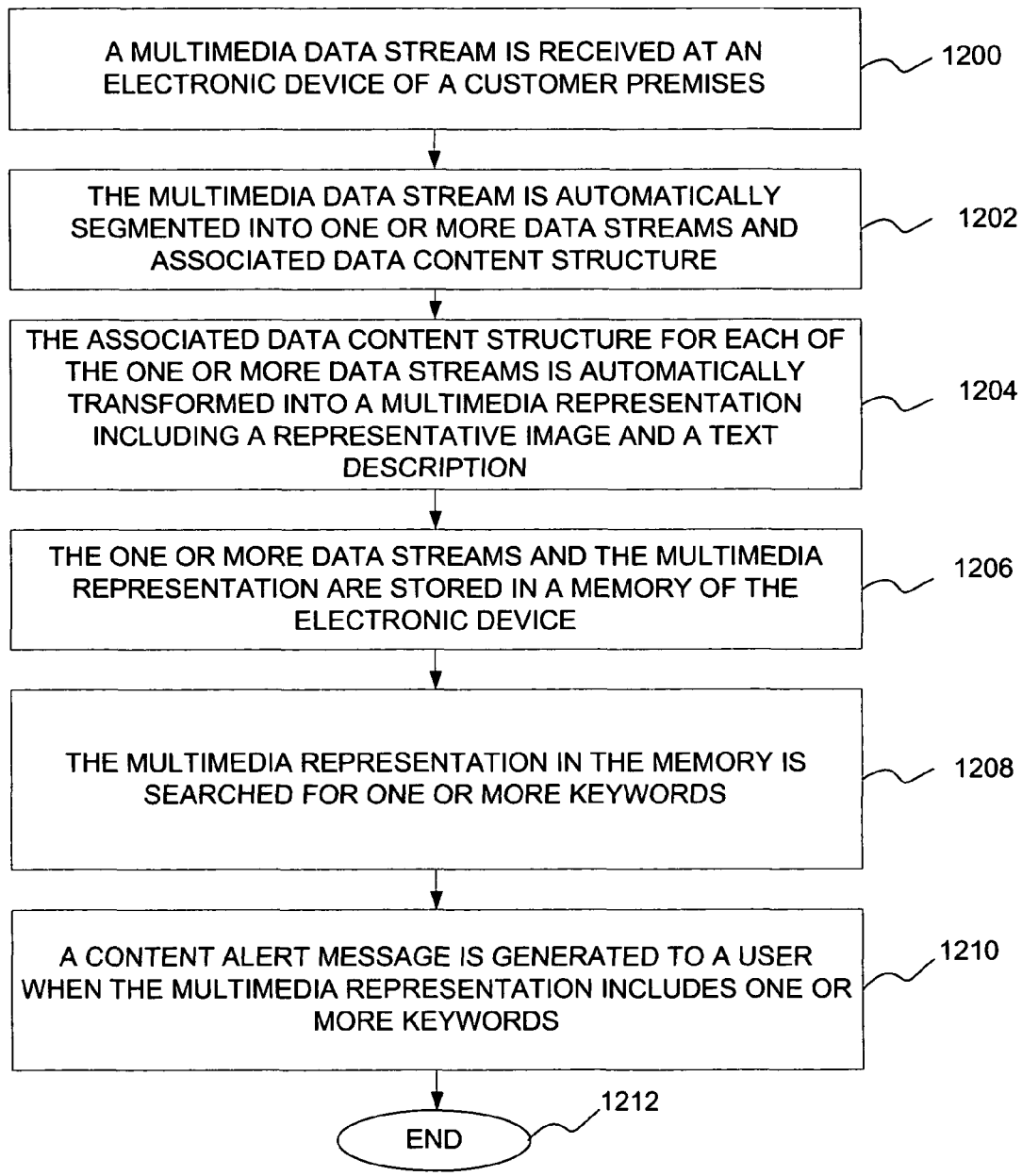
FIG. 12 is a flow diagram of a third particular illustrative embodiment of a method of distributing media content.

FIG. 12 is a flow diagram of a third particular illustrative embodiment of a method of distributing media content. The electronic device receives a multimedia data stream (block 1200). The electronic device automatically segments the multimedia data stream into one or more data streams and associated data content structure (block 1202). The electronic device automatically transforms the associated data content structure for each of the one or more data streams to produce a multimedia representation including a representative image and a text description (block 1204). The electronic device stores one or more data streams and stores the multimedia representation (block 1206). An alert generation module of the electronic device searches the multimedia representation for one or more keywords (block 1208). The alert generation module generates a content alert message to a display device coupled to the electronic device when the multimedia representation includes one or more keywords (block 1210). The method terminates at 1212.

In a particular embodiment, the memory and one or more remote devices are searched to identify data streams containing information related to at least one keyword of the one or more keywords. The content alert message can include a user selectable multimedia representation associated with identified data stream.

In general, while the above-described methods have been presented in a particular sequence, it should be understood that the sequences are presented for illustrative purposes, and that the particular methods may be performed in a number of alternative sequences.

In conjunction with the systems and methods disclosed herein, an electronic device is provided to acquire and store multimedia content received from a network. The electronic device can automatically generate a multimedia representation of the stored multimedia content, including a representative image and an associated text description, which may be provided to a centralized content index via a network. The centralized content index may be accessible to other electronic devices on the network. The electronic device can receive a request for a selected multimedia data stream from another electronic device, can establish a peer-to-peer connection with the other electronic device, and can stream the selected multimedia data stream to the other electronic device via the peer-to-peer connection.

Figure 13:
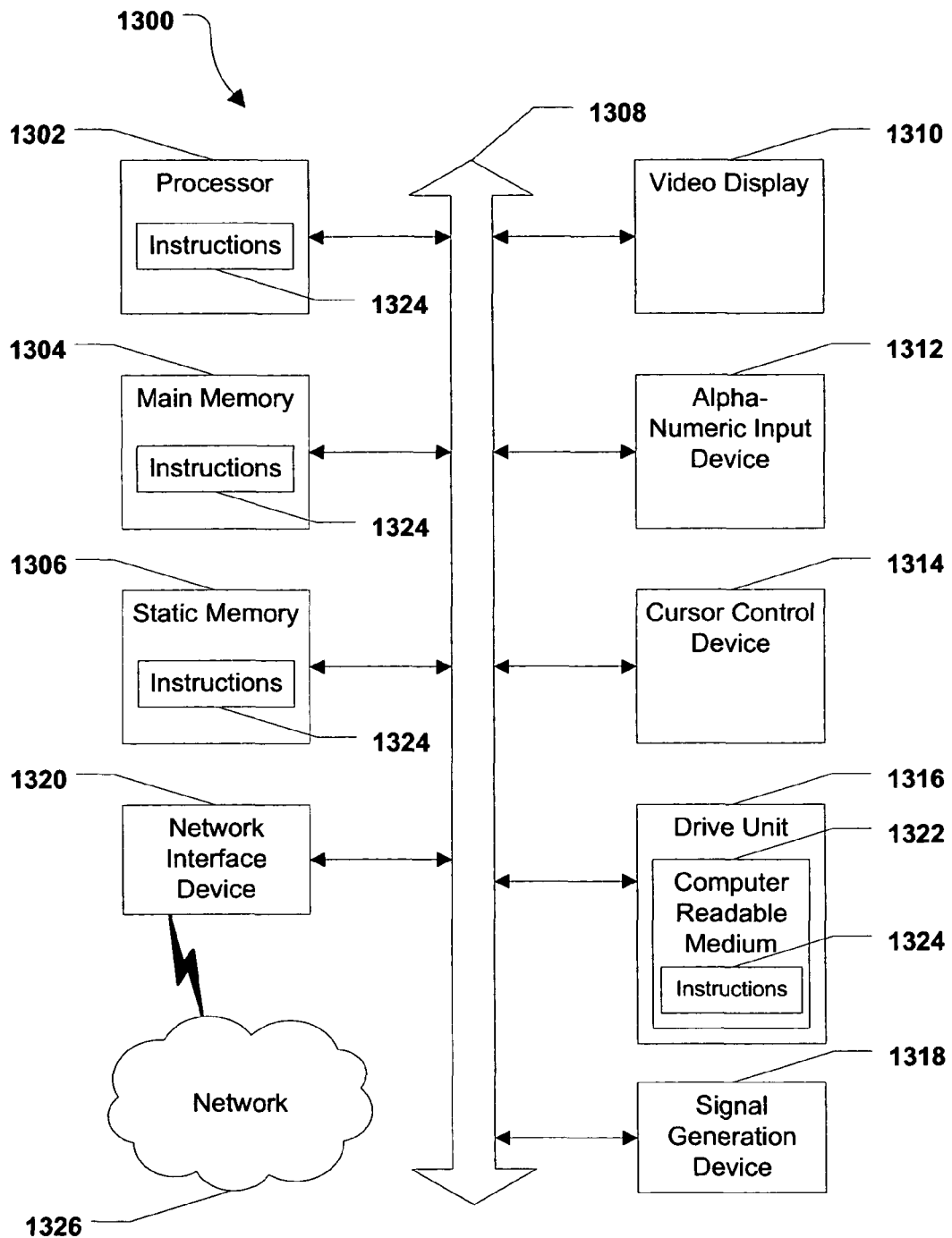
FIG. 13 is a block diagram of an illustrative embodiment of a general computer system.

Referring to FIG. 13, an illustrative embodiment of a general computer system is shown and is designated 1300. The computer system 1300 can include a set of instructions that can be executed to cause the computer system 1300 to perform any one or more of the methods or computer based functions disclosed herein. The computer system 1300 can operate as a standalone device or can be connected, e.g., using a network, to other computer systems or peripheral devices, such as the systems and electronic devices shown in FIGS. 1 and 2.

In a networked deployment, the computer system can operate in the capacity of a server or as a client user computer in a server-client user network environment, or as a peer computer system in a peer-to-peer (or distributed) network environment. The computer system 1300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1300 can be implemented using electronic devices that provide voice, video or data communication. Further, while a single computer system 1300 is illustrated, the term "system" shall also be taken to include any collection of systems or sub-systems that individually or jointly execute a set, or multiple sets, of instructions to perform one or more computer functions.

As illustrated in FIG. 13, the computer system 1300 can include a processor 1302, e.g., a central processing unit (CPU), a graphics processing unit (GPU), or both. Moreover, the computer system 1300 can include a main memory 1304 and a static memory 1306, that can communicate with each other via a bus 1308. As shown, the computer system 1300 can further include a video display unit 1310, such as a liquid crystal display (LCD), an organic light emitting diode (OLED), a flat panel display, a solid state display, or a cathode ray tube (CRT). Additionally, the computer system 1300 can include an input device 1312, such as a keyboard, and a cursor control device 1314, such as a mouse. The computer system 1300 can also include a disk drive unit 1316, a signal generation device 1318, such as a speaker or remote control, and a network interface device 1320.

In a particular embodiment, as depicted in FIG. 13, the disk drive unit 1316 can include a computer-readable medium 1322 in which one or more sets of instructions 1324, e.g. software, can be embedded. Further, the instructions 1324 can embody one or more of the methods or logic as described herein. In a particular embodiment, the instructions 1324 can reside completely, or at least partially, within the main memory 1304, the static memory 1306, and/or within the processor 1302 during execution by the computer system 1300. The main memory 1304 and the processor 1302 also can include computer-readable media.

In an alternative embodiment, dedicated hardware implementations, such as application specific integrated circuits, programmable logic arrays and other hardware devices, can be constructed to implement one or more of the methods described herein. Applications that can include the apparatus and systems of various embodiments can broadly include a variety of electronic and computer systems. One or more embodiments described herein can implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein can be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1324 or receives and executes instructions 1324 responsive to a propagated signal, so that a device connected to a network 1326 can communicate voice, video or data over the network 1326. Further, the instructions 1324 can be transmitted or received over the network 1326 via the network interface device 1320.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives can be considered a distribution medium that is equivalent to a tangible storage medium. Accordingly, the disclosure is considered to include any one or more of a computer-readable medium or a distribution medium and other equivalents and successor media, in which data or instructions can be stored.

Although the present specification describes components and functions that can be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and can not be drawn to scale. Certain proportions within the illustrations can be exaggerated, while other proportions can be minimized. Accordingly, the disclosure and the figures are to be regarded as illustrative rather than restrictive.

One or more embodiments of the disclosure can be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose can be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features can be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter can be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving a multimedia data stream comprising audio data, video data, and text data at a first electronic device of a plurality of electronic devices responsive to a network;
   automatically identifying discrete segments of the multimedia data stream at least partially based on the text data, wherein the discrete segments are related to different topics;
   storing at least a portion of the multimedia data stream in a local media database;

creating a text-based description of at least a first discrete segment of the discrete segments of the multimedia data stream based at least partially on information in the multimedia data stream;

automatically determining a table of contents of the multimedia data stream at least partially based on the text-based description, wherein the table of contents includes information related to the different topics to which the discrete segments are related;

categorizing at least one of the discrete segments of the multimedia data stream in one of a plurality of searchable categories based on the text-based description;

in response to receiving the multimedia data stream, generating a network index alert to update a centralized content index of media content available via the network, wherein the centralized content index includes information about media content stored at the first electronic device and information about media content stored at the plurality of electronic devices;

establishing a peer to peer connection between the first electronic device at a first end user location and a second electronic device at a second end user location;

sharing the multimedia data stream with the second electronic device;

searching the text-based description for one or more keywords; and generating a content alert message when the text-based description includes at least one of the one or more keywords, wherein searching the text-based description comprises periodically searching a memory of the first electronic device and periodically searching the centralized content index to identify particular discrete segments of media content that are associated with information related to at least one keyword of the one or more keywords and wherein the centralized content index is at a network device configured to receive an electronic payment from the second electronic device.

2. The method of claim 1, wherein the network index alert includes the text-based description of at least the first discrete segment, information associated with the table of contents, and a unique identifier.

3. The method of claim 2, further comprising:
automatically searching a local content index of the first electronic device and automatically searching the centralized content index using one or more keywords from a consumer profile associated with the first electronic device; and automatically sending a personal media alert to a display device coupled to the first electronic device when at least one keyword of the one or more keywords is found.

4. The method of claim 3, wherein the personal media alert includes a user selectable list of available media content that matches at least one keyword of the one or more keywords, wherein each element in the user selectable list comprises a representative image related to a particular discrete segment of media content, a text-based description of the particular segment of the media content, information associated with a table of contents of the media content, and the unique identifier.

5. The method of claim 4, further comprising:
in response to receiving input selecting a particular list element that is associated with a third electronic device from the user selectable list, transmitting a request for the particular list element to the third electronic device, the request including a device identifier associated with the first electronic device, a unique identifier associated with the particular list element, and payment information; and receiving a multimedia data stream related to the particular list element from the third electronic device.

6. The method of claim 1, wherein the text data comprises closed-caption text within the multimedia data stream and electronic program guide data associated with the multimedia data stream.

7. The method of claim 1, further comprising:
generating a text transcription from the audio data using a speech recognition module, the text transcription including timing information, wherein the timing information is synchronized with the video data;

extracting the text data from the multimedia data stream; and aligning the text data to the timing information to synchronize the text data with the video data.

8. The method of claim 1, wherein automatically identifying discrete segments of the multimedia data stream includes identifying scene transitions within a single program based on the video data.

9. The method of claim 1, wherein automatically identifying discrete segments of the multimedia data stream includes identifying commercials in the multimedia data stream.

10. An electronic device, comprising:
a memory;
a network interface responsive to a network;
an acquisition module coupled to the network interface, the acquisition module configured to capture a multimedia data stream;
a processing module coupled to the acquisition module, the processing module configured to:
automatically identify discrete segments of the multimedia data stream, wherein the discrete segments are related to different topics;
extract a representative image for at least one discrete segment;
automatically generate a text description of the at least one discrete segment from information in the multimedia data stream; and
categorize the at least one discrete segment in one of a plurality of searchable categories based on the text description, wherein the processing module stores the at least one discrete segment in a local content database and stores the representative image and the text description in a local content index;
an alert generation module configured to:
generate, in response to capturing the multimedia data stream, a network index alert to update a centralized content index of media content available via the network, wherein the centralized content index includes information about media content stored at the electronic device;
search the text description for one or more keywords; and
generate a content alert message when the text description includes at least one of the one or more keywords,
wherein searching the text description comprises periodically searching the memory and periodically searching the centralized content index to identify particular discrete segments of media content that include information related to at least one keyword of the one or more keywords;

a personal media alert module configured to:
search the local content index and the centralized content index for keywords associated with a consumer profile; and
send an alert including information identifying segments of media content associated with at least one of the keywords that are listed in the local content index and the centralized content index to a display device coupled to the electronic device, wherein the centralized content index identifies discrete segments of media content stored at a second electronic device that is remote from the electronic device and remote from a network device that stores the centralized content index; and
a peer to peer module configured to:
establish a peer to peer connection with the second electronic device; and
share the at least one discrete segment of the multimedia data stream with the second electronic device,
wherein the network device is configured to receive an electronic payment from the second electronic device.

11. The electronic device of claim 10, wherein the personal media alert module is configured to:
detect a change in the local content index;
generate a content index update; and
send the content index update to the network device that stores the centralized content index via the network,
wherein the content index update includes the text description of the at least one discrete segment.

12. The electronic device of claim 10, further comprising a local billing module configured to:
record a request for local content from the second electronic device in a usage log, the local billing module to receive the electronic payment; and
direct a portion of the electronic payment to an owner of the multimedia data stream.

13. The electronic device of claim 12, wherein the owner comprises a copyright owner of the at least one discrete segment of the multimedia data stream.

14. The electronic device of claim 10, further comprising a second network interface coupled to the acquisition module and responsive to a proprietary network, wherein the second network interface is configured to:
receive a broadcast multimedia data stream; and
provide the broadcast multimedia data stream to the acquisition module.

15. The electronic device of claim 10, further comprising:
an input interface; and
an input device operable to configure the consumer profile to include one or more keywords related to subject matter of interest to a user of the electronic device.

16. The electronic device of claim 10, further comprising a billing module configured to:
record requests to access the discrete segments in a usage log; and
send a single billing transaction request based on the usage log to a payment system after a predetermined number of requests have been recorded.

17. The electronic device of claim 10, further comprising a speaker boundary detection module configured to generate speaker boundary information based on audio content of the multimedia data stream, wherein the speaker boundary information is used to identify the discrete segments of the multimedia data stream.

18. A method of distributing media content, the method comprising:
receiving a multimedia data stream associated with a single program at a first electronic device of a plurality of electronic devices responsive to a network, the first electronic device associated with a first customer;
identifying boundaries within the multimedia data stream based on content of the multimedia data stream;
automatically segmenting the multimedia data stream into discrete segments of media content based on the boundaries;
generating a text description of each of the discrete segments based at least partially on information in the discrete segments;
categorizing the discrete segments into one or more categories of a plurality of searchable categories based on the text description of each of the discrete segments;
storing the discrete segments and the text descriptions in a memory of the first electronic device, wherein a local content index in the memory includes table of contents information of the multimedia data stream based on the discrete segments of the media content;
in response to receiving the multimedia data stream, generating a network index alert to update a centralized content index of media content available via the network, wherein the centralized content index includes information about media content stored at the first electronic device and information about media content stored at the plurality of electronic devices;
establishing a peer to peer connection between the first electronic device and a second electronic device;
sharing the multimedia data stream with the second electronic device;
searching the text description for one or more keywords; and
generating a content alert message when the text description includes at least one of the one or more keywords,
wherein searching the text description comprises periodically searching the memory and periodically searching the centralized content index to identify particular discrete segments of media content that are associated with information related to at least one keyword of the one or more keywords and
wherein the centralized content index is at a network device configured to receive an electronic payment from the second electronic device.

19. The method of claim 18, wherein the content of the multimedia data stream includes a news story.

20. The method of claim 18, wherein the payment is received after transferring at least one of the discrete segments to the second electronic device.

21. The method of claim 18, wherein determining the text description of the one or more discrete segments comprises identifying content of the multimedia data stream that includes a name of at least one country, person, or location.

22. The method of claim 18, further comprising accessing a text transcript of audio data of the multimedia data stream, wherein the text transcript is not included in the multimedia data stream, wherein the text transcript includes timing information to synchronize text of the text transcript with video data of the multimedia data stream, and wherein the multimedia data stream is segmented at least partially based on the text transcript.

23. A computer-readable storage device storing instructions that, when executed by a processor, cause the processor to perform operations comprising:
identifying boundaries within a multimedia data stream of a first electronic device based on content of the multimedia data stream, wherein the multimedia data stream is associated with a single program;
segmenting the multimedia data stream into data segments based on the boundaries;
automatically generating text descriptions of the data segments using information in the data segments;
categorizing each of the data segments into one or more searchable categories based on the text descriptions;
transmitting a first data segment of the data segments to a remote electronic device;
generating a network index alert to update a centralized content index at a network device configured to receive an electronic payment from the remote electronic device;
establishing a peer to peer connection between the first electronic device and the electronic device;
searching the text descriptions for one or more keywords; and
generating a content alert message when the text descriptions include at least one of the one or more keywords,
wherein searching the text descriptions comprises periodically searching a memory of the first electronic device and periodically searching the centralized content index to identify particular discrete segments of media content that are associated with text descriptions that include information related to at least one keyword of the one or more keywords.

24. The computer-readable storage device of claim 23, wherein the operations further comprise generating a personal media alert to a first user when the text descriptions include at least one keyword of a set of keywords associated with a profile of the first user.

25. The computer-readable storage device of claim 23, wherein the centralized content index identifies discrete segments of media content stored at a plurality of electronic devices that are remote from the first electronic device and remote from the network device that stores the centralized content index, and wherein the network index alert includes the text descriptions and a representative image associated with each of the one or more data segments.

26. The computer-readable storage device of claim 23, wherein the operations further comprise streaming a particular data segment of the one or more data segments to the remote electronic device.

27. The computer-readable storage device of claim 23, wherein the operations further comprise:
aggregating information regarding the electronic payment;
executing the electronic payment after a number of micropayments are received; and
compensating a content owner of the multimedia data stream using at least a portion of the micropayments.

28. The computer-readable storage device of claim 23, wherein the boundaries are identified based at least partially on an identified speaker associated with a particular portion of the multimedia data stream.

\* \* \* \* \*